United States Patent
Achtermann et al.

(10) Patent No.: US 7,792,984 B2
(45) Date of Patent: Sep. 7, 2010

(54) SYSTEMS AND METHODS FOR THE DISTRIBUTION OF BULK DATA USING MULTICAST ROUTING THAT MITIGATES NETWORK TRAFFIC ON SUBNETS

(75) Inventors: Jeffrey Mark Achtermann, Austin, TX (US); Robert Earl Guthrie, Austin, TX (US); Christopher Victor Lazzaro, Austin, TX (US); Mark Allen Sistrunk, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1750 days.

(21) Appl. No.: 10/351,564

(22) Filed: Jan. 23, 2003

(65) Prior Publication Data

US 2004/0148421 A1 Jul. 29, 2004

(51) Int. Cl.
*G06F 15/16* (2006.01)
(52) U.S. Cl. .................................. 709/232; 709/231
(58) Field of Classification Search ................. 709/231, 709/232
See application file for complete search history.

(56) References Cited

U.S. PATENT DOCUMENTS

| | | | | |
|---|---|---|---|---|
| 4,623,920 A | * | 11/1986 | Dufresne et al. | 380/240 |
| 5,835,723 A | * | 11/1998 | Andrews et al. | 709/226 |
| 6,018,771 A | | 1/2000 | Hayden | 709/231 |
| 6,138,144 A | * | 10/2000 | DeSimone et al. | 709/204 |
| 6,377,997 B1 | * | 4/2002 | Hayden | 709/231 |
| 6,501,957 B2 | * | 12/2002 | Muhonen et al. | 455/503 |
| 6,625,652 B1 | * | 9/2003 | Miller et al. | 709/227 |
| 7,061,880 B2 | * | 6/2006 | Basilier | 370/312 |
| 2002/0049066 A1 | * | 4/2002 | Muhonen et al. | 455/503 |
| 2002/0049635 A1 | * | 4/2002 | Mai et al. | 705/14 |
| 2002/0116529 A1 | * | 8/2002 | Hayden | 709/245 |
| 2002/0129159 A1 | * | 9/2002 | Luby et al. | 709/236 |
| 2003/0073453 A1 | * | 4/2003 | Basilier | 455/503 |
| 2003/0233540 A1 | * | 12/2003 | Banerjee et al. | 713/153 |
| 2005/0283447 A1 | * | 12/2005 | Xu et al. | 705/400 |
| 2006/0039388 A1 | * | 2/2006 | Shur et al. | 370/401 |
| 2006/0146823 A1 | * | 7/2006 | Ding | 370/390 |
| 2006/0209787 A1 | * | 9/2006 | Okuda | 370/351 |
| 2007/0233891 A1 | * | 10/2007 | Luby et al. | 709/231 |
| 2008/0232292 A1 | * | 9/2008 | Zhang | 370/312 |

* cited by examiner

*Primary Examiner*—Nathan Flynn
*Assistant Examiner*—Mohamed Wasel
(74) *Attorney, Agent, or Firm*—Yee & Associates, P.C.; Jeffrey S. LaBaw

(57) ABSTRACT

Systems and methods for the distribution of bulk data using multicast routing are provided. A multicast advertisement is sent to potential receivers of the bulk distribution. The advertisement may include a list of intended receivers and the 'multicast group that the distribution will be multicast on. In response to the advertisement, intended receivers may listen on the multicast group address for the bulk data. Receivers that are not targets for the distribution do not join the multicast group, and consequently, the delivery of data by routers to subnets that have no target receivers may thus be obviated.

10 Claims, 6 Drawing Sheets

SYSTEMS AND METHODS FOR THE DISTRIBUTION OF BULK DATA USING MULTICAST ROUTING THAT MITIGATES NETWORK TRAFFIC ON SUBNETS

TECHNICAL FIELD

The present invention relates generally to data processing systems, and in particular, to bulk data distributions within networked data processing systems.

BACKGROUND INFORMATION

Present day data processing systems are often configured in large multi-user networks. Management of such networks may typically include the need to transfer bulk data to an endpoint, or receiver, system from a source system (or, simply, "a source"). Such large data transfers may occur within a network, for example, to distribute software updates.

Data may be distributed by multicasting the distribution to the receivers. (Multicast transmissions, within the Internet Protocol (IP) framework are transmissions from one or more sources to a group of addressees. (In IP multicast, packets are sent to the multicast group, which is identified by a single IP address, rather than addressing each packet to the individual receivers.) Generally, such multicast distributions are more efficient than unicast transmission of the bulk data.

FIG. 1 illustrates a networked data processing system 100 that may be used in conjunction with the multicast transmission of data. System 100 includes a multicast source 102 that is connected to network 104 via router 106. (Network 104 may be the Internet, however, for the purposes of the present invention, the particular network or internetwork is not significant. It suffices that a suite of standardized communication protocols exist, commonly referred to as the TCI/IP (Transmission Control Protocol/Internet Protocol) suite, or simply TCP/IP, that may be used to effect the communications across network 104.) A plurality of receivers reside on respective ones of subnetworks 108 and 110. (Network receivers may be generically referred to as "hosts" when the particular role as a receiver of multicast data need not be denoted.) Subnetwork ("subnet") 108 includes receivers 112, 114, 116 and 118, and is connected to network 104 via router 120. Subnet 110 includes receivers 122, 124 and 126, and is connected to network 104 via router 130. Receivers may join and leave a multicast group by exchanging group membership information with a multicast router, which may be assumed for illustrative purposes to be router 120 for receivers in subnet 108 and router 130 with respect to receivers in subnet 110. A receiver may join a group by sending a membership report packet to the router, which maintains a group database (not shown). (Note, however, membership of a receiver in the "all hosts" group is automatic.) TCP/IP includes the Internet Group Management Protocol (IGMP) for the reporting of group memberships by hosts. IGMP, version 2 is described in RFC (Request for Comments) 2236, promulgated by the Internet Engineering Task Force (IETF).

Within the enterprise, many different bulk data distributions may occur. These need not necessarily target all of the receivers on the network. Receivers that are not targets of a particular distribution will ignore the data. However, in a multicast distribution, the routers will forward the data to each subnet having at least one receiver that is a member of the target group, even if that receiver itself is not a target of the distribution. Consequently, the distribution data will needlessly flow to such a subnet. Therefore, there is a need in the art for methods and systems to avoid the sending of multicast bulk distribution data on subnets having no receivers that are targets of the distribution.

BRIEF DESCRIPTION OF THE DRAWINGS

For a more complete understanding of the present invention, and the advantages thereof, reference is now made to the following descriptions taken in conjunction with the accompanying drawings, in which.

SUMMARY OF THE INVENTION

Figure 1:
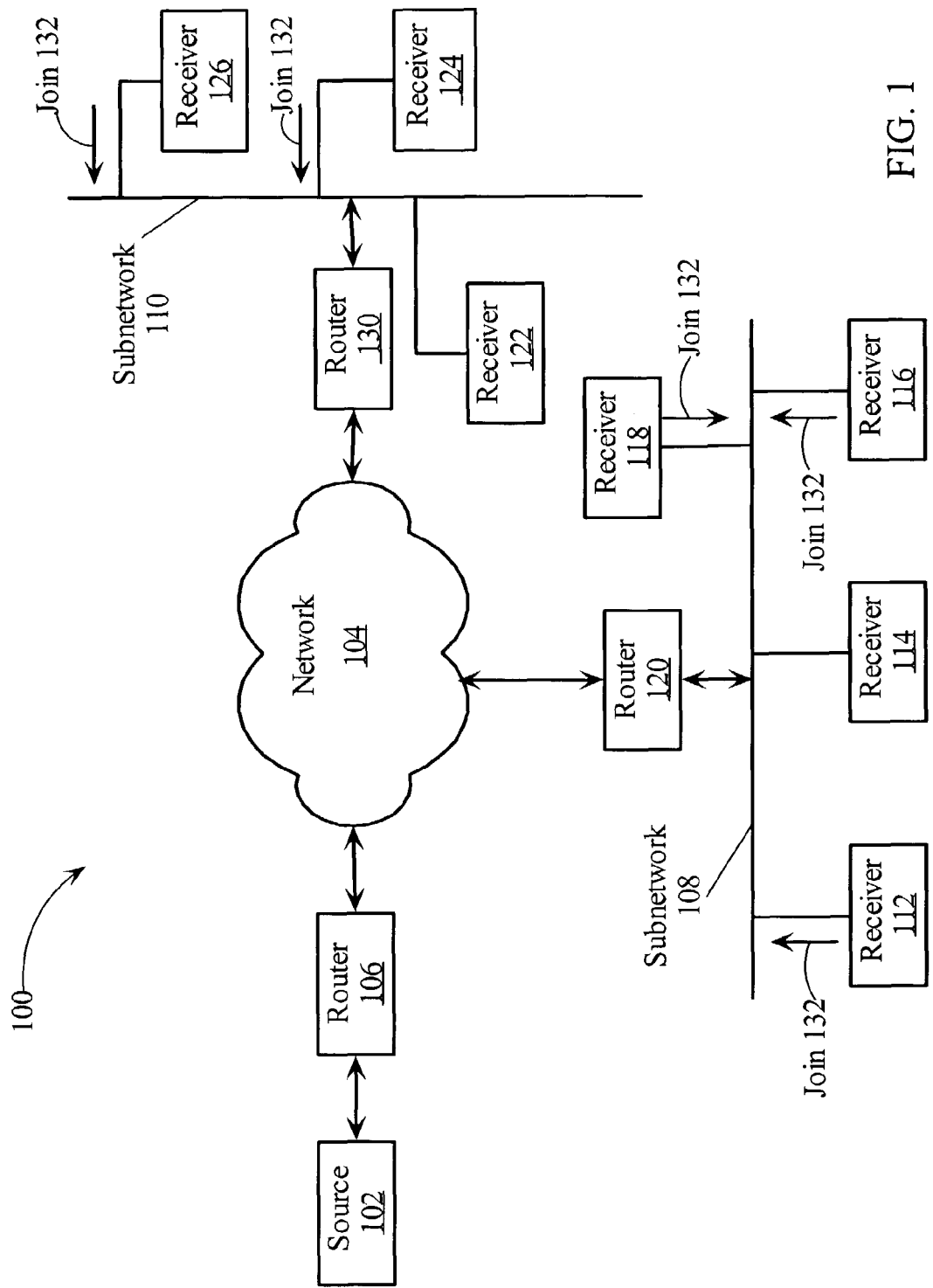
FIG. 1 illustrates an exemplary network topology which may be used in conjunction with the present invention.

The aforementioned needs are addressed by the present invention. In one embodiment, a method for multicast distribution of bulk data may be performed. The method includes multicasting a message on a selected multicast address. The message includes a list of target receivers of a data distribution and a multicast address of the distribution. A set of potential target receivers listens on the selected multicast address. In accordance with the method, the data distribution is multicast on the multicast address included in the message.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

DETAILED DESCRIPTION

Systems and methods for the distribution of bulk data using multicast routing are provided. A multicast advertisement is sent to potential receivers of the bulk distribution. The advertisement may include a list of intended receivers and the multicast group that the distribution will be multicast on. In response to the advertisement, intended receivers may listen on the multicast group address for the bulk data. Receivers that are not targets for the distribution do not join the multicast group, and consequently, the delivery of data to subnets that have no target receivers may thus be obviated.

In the following description, numerous specific details are set forth to provide a thorough understanding of the present invention. For example, particular transport protocols or network addresses may be referred to, however, would be recognized by those of ordinary skill in the art that the present invention may be practiced without such specific details, and, in other instances, well-known circuits have been shown in block diagram form in order not to obscure the present invention in unnecessary detail. Refer now to the drawings, wherein depicted elements are not necessarily shown to scale and where like or similar elements are designated by the same reference numeral through the several views.

Figure 2:
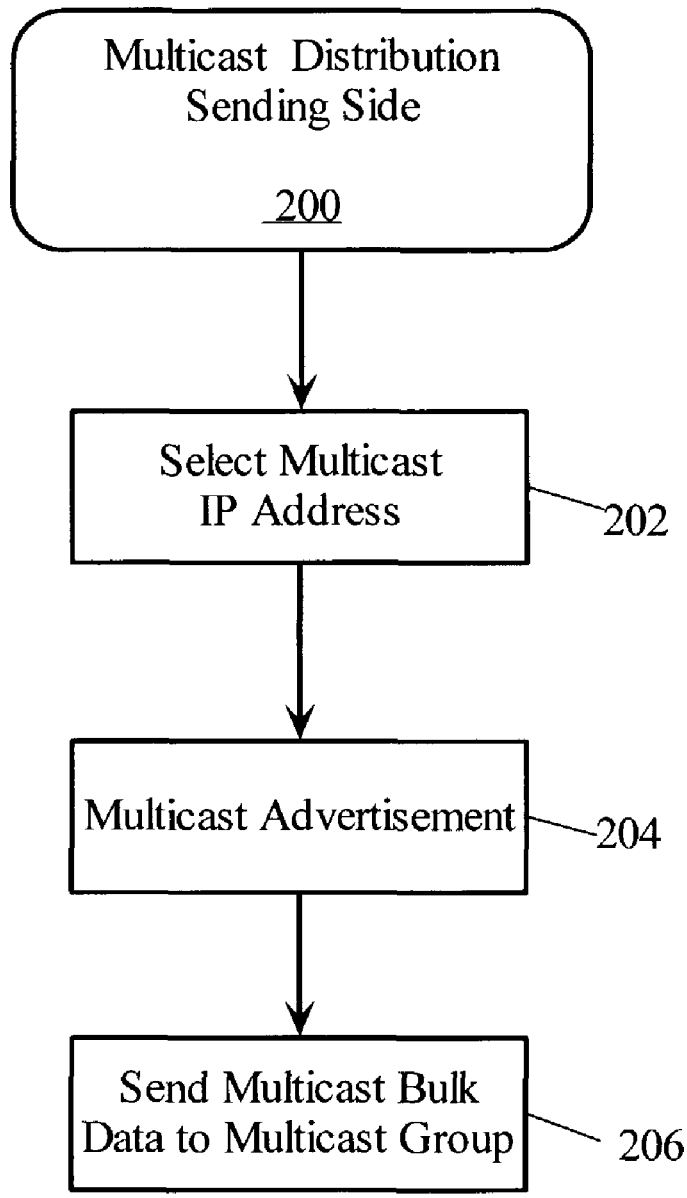
FIG. 2 illustrates, in flow chart form, a sending side process for multicast distribution of bulk data in accordance with an embodiment of the present invention.

FIG. 2 illustrates, in flow chart form, a methodology 200 for sending bulk data distributions using multicast routing. The flowcharts provided herein are not necessarily indicative of the serialization of operations being performed in an embodiment of the present invention. Steps disclosed within these flowcharts may be performed in parallel. The flowcharts are indicative of those considerations that may be performed to produce the operations available to send and receive multicast data distributions. It is further noted that the order presented is illustrative and does not necessarily imply that the steps must be performed in order shown.

In step 202, a multicast IP address is selected. The Internet Protocol (IP) is a standard protocol that provides for a connectionless packet delivery. IP hides the underlying physical network through a virtual network view. IP delivery of packets may be unreliable. However, it would be appreciated by those of ordinary skill in the art that other protocols within the TCP/IP suite address the reliable delivery of data. In accordance with the present IP standards, Internet addresses (technically referred to as Internet Numbers) are 32-bit numbers commonly represented in "dotted decimal" form (the decimal representation of four 8-bit values concatenated with dots). In particular, a subset of possible IP numbers are assigned as multicast addresses in the IP addressing standards. (These are addresses in the range 224.0.0.0 through 239.255.255.255. IP addressing is specified in RFC 1166, Internet Numbers, promulgated by the IETF.) For the purposes herein, it is assumed that each of the receivers on the network has joined the multicast groups addressed by the set of addresses from which the multicast IP address in step 202 is selected. Thus, for example, in the exemplary system of FIG. 1, receivers 112-118 on subnet 108, and receivers 122-126 on subnet 110 are assumed to have joined a common multicast group, or groups, having multicast IP addresses within the set from which the multicast address is selected in step 202. The common multicast group may be predetermined by the user, selected from any of the valid multicast addresses. (The mechanism by which a host joins a multicast group is specified within the TCP/IP suite of protocols, and will be discussed further in conjunction with FIG. 4, below.)

In step 204, an advertisement of the distribution is multicast on the address selected in step 202. The advertisement may include a list of the targets for the distribution, and the multicast group that the bulk data distribution will be sent to. The multicast group may be specified by the multicast IP address selected in step 202. As will be discussed in conjunction with FIG. 4, receivers may use this information to determine whether to receive the bulk distribution, which is subsequently distributed by multicast routing, by sending the multicast bulk data to the IP address included in the multicast advertisement. The multicast bulk data is sent in step 206 of process 200.

Figure 3:
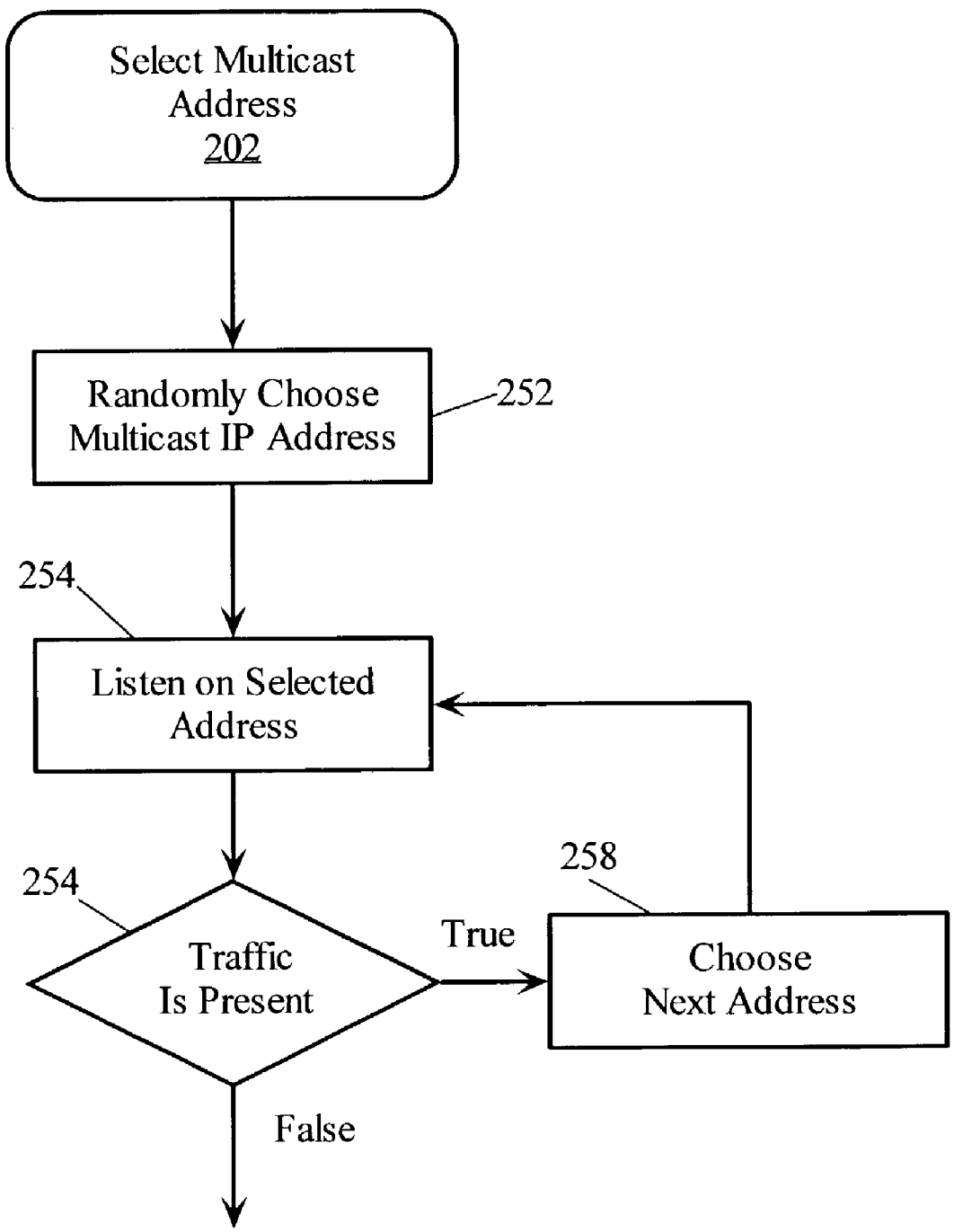
FIG. 3 illustrates in further detail a portion of the methodology in FIG. 2.

Before describing the receiver side processes for receiving multicast bulk data, refer to FIG. 3 illustrating in further detail a methodology for selected a multicast address in accordance with step 202 of FIG. 2.

In step 252, a multicast IP address is randomly chosen from a selected set of IP addresses representing multicast groups within the data processing network. The user may specify a low address for example, (224.2.128.0) and a high address for example, (224.2.255.255). The algorithm is then free to pick any multicast address within this range. Techniques for randomly picking a member of a set of elements are known in the data processing art. For example, Java provides a class, the Random class; Random class objects instantiate a random number generator that may be used to randomly select a multicast address. In particular, the nextInt (int n) method of the Random class returns a uniformly distributed random value between zero and n. This may be used, for example, by converting the high and low addresses to integers and specifying n to be the difference between the high address and the low address. The nextInt (int n) method invocation returns a random integer that may be added to the low address (converted to an integer) which may then be converted back to dotted decimal form to provide the multicast address. The high and low address are converted into integers and then the low is subtracted from the high to determine the range. This method may be used to pick a random number between 0 and the range. This number is then added to the low address and the result converted to x.x.x.x format. (It would be understood by those of ordinary skill in the data processing art, that so-called "random" numbers generated using algorithmic methods are quasi-random inasmuch as a set machine instructions yield deterministic operations. In accordance with accepted practice in the art, the distinction is not material to the present invention, and such numbers may be referred to herein as "random numbers," and process steps using random numbers will be referred to as a random step, process, operation or similar terminology.)

In step 254, the distribution source, for example, source 102, FIG. 1, listens on the selected address for any existing network traffic. The source may listen for a user selected time interval. This time interval may be in an embodiment of the present invention in the range from five (5) to ten (10) seconds. In an alternative embodiment, a range of one (1) to fifteen (15) seconds may be used. However, it would also be appreciated by those of ordinary skill in the art that other listening times may be used to accommodate the particular characteristics of the network, such as the volume of multicast traffic and other network properties. Such alternative embodiments would be understood to fall within the spirit and scope of the present invention. If, (step 256), traffic is detected, the next address in the set of multicast IP addresses is selected (step 258) and the sender listens on the new address, in step 254. Process 200 loops over steps 254-258 until a multicast address free of network traffic is found. Process 200 exits the loop via the "False" path in decision block 256 and proceeds to step 204, FIG. 2, whereby the distribution advertisement is multicast on the selected address as previously described.

Figure 4:
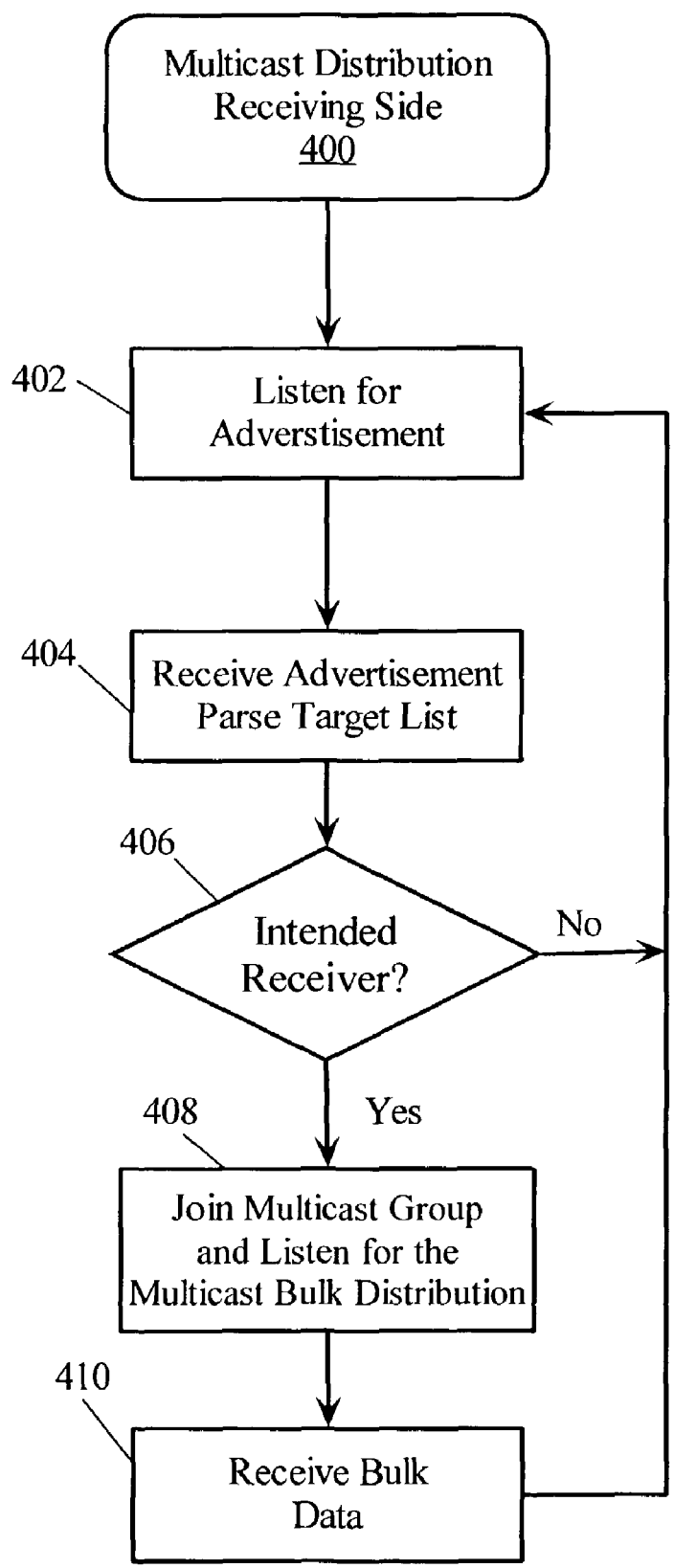
FIG. 4 illustrates, in flow chart form, a process for multicast distribution of bulk data at the receiving side, in accordance with an embodiment of the present invention.

Refer now to FIG. 4, illustrating, in flow chart form process 400 for receiving multicast bulk data distributions in accordance with the principles of the present invention. In step 402, process 400 listens for a multicast distribution advertisement. As previously discussed, receivers on a network which are potential targets of the data distribution may be joined to a common multicast group. In accordance with IP multicast routing, all IP datagrams, in other words, the datagrams constituting the multicast distribution advertisement, are forwarded by the multicast router to all members of the multicast group. (For example, in the exemplary system in FIG. 1, routers 120 and 130 may be multicast routers with respect to multicast groups on subnet 108 and subnet 110, respectively.) Because all of the receivers are assumed to be a member of the group to which the multicast advertisement is addressed, the multicast advertisement flows on both subnet 108 and subnet 110. In other words, the respective multicast router forwards the multicast advertisement datagrams to each of the receivers on the corresponding subnetworks.

In step 404, the multicast distribution advertisement is received, and the target list is parsed to determine if the receiver is an intended target of the advertised distribution. If, in step 406, the receiver is not an intended target, process 400 returns to step 402.

Otherwise, if, in step 406, the receiver, that is the receiver performing process 400, is an intended target of the multicast distribution, the receiver listens on the multicast group addresses included in the advertisement (step 408). Recall, the multicast advertisement includes the multicast IP address of the multicast group to which the bulk data distribution will be sent. The receiver, in step 408, joins the corresponding multicast group, and listens for the multicast bulk distribution. A network host may join a multicast group in accordance with standard mechanisms. In particular, the Internet Group Management Protocol (IGMP) may be used by hosts to join or leave a multicast host group. Group membership information is exchanged between a specific host, that is in this instance, a receiver, and the nearest multicast router. (IGMP Version 2 is specified in RFC 2236.) To join the multicast group corresponding to the multicast IP address received in the advertisement, a targeted receiver sends an IGMP message to the multicast router (for example, a corresponding one of routers 120 and 130 in FIG. 1). Multicast routers maintain a local group database that tracks the group membership of the router's directly attached networks. Included in the IGMP message is the IP multicast address received in the multicast advertisement in step 404. In FIG. 1, such IGMP messages are schematically depicted by arrows 132. For the purpose of illustration, receivers 112, 116 and 118 on subnet 108 are depicted as sending join messages, and likewise, receivers 124 and 126 on subnet 110. In accordance of the principles of the present invention, in this example, receivers 112, 116 and 118 would be targets of the bulk distribution. Similarly, receivers 124 and 126, on subnet 110, would also be targets.

Returning to FIG. 4, in step 410, the bulk data is received. Recall that in accordance with process 200, discussed in FIG. 2, the source of the distribution multicasts the bulk data distribution to the multicast group having the multicast IP address included in the multicast advertisement received in step 404. When a router receives a datagram addressed to this address, the router forwards the datagram out each interface having receivers belonging to the group.

In FIG. 1, as previously described, both subnet 108 and subnet 110 include receivers that have been targeted for the bulk data distribution, and therefore, have joined the multicast group on which the bulk distribution will be multicast. If, however, alternatively one of the subnetworks includes no targeted receivers, the configuration illustrated, in simplified form, in FIG. 5 pertains.

Figure 5:
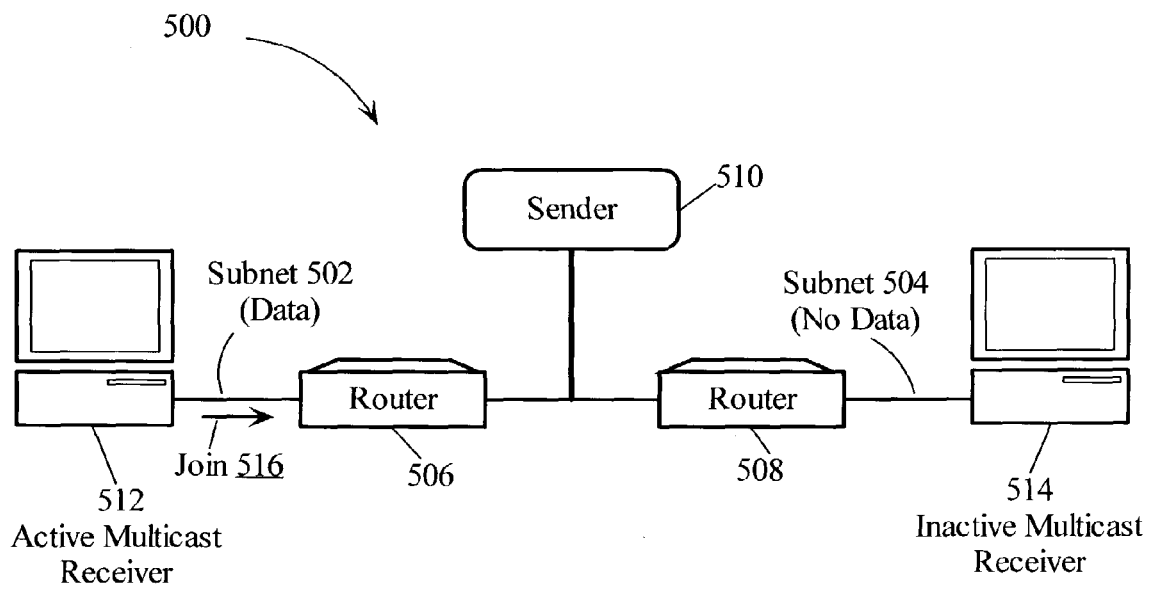
FIG. 5 illustrates, in simplified form, a network in accordance with the exemplary network of FIG. 1 depicting bulk data distribution in accordance with the present inventive principles.

FIG. 5 illustrates a network 500 which may be used in conjunction with the present inventive principles for multicast distribution of bulk data. Network 500 includes two subnetworks, subnet 502 and 504 coupled via corresponding routers 506 and 508 to a multicast sender 510. To distribute bulk data, sender 510 may perform the operations described hereinabove in conjunction with FIG. 2. Likewise, receiver 512 and receiver 514 may receive bulk data by performing the operations described in conjunction with process 400, FIG. 4. Suppose, now, that in accordance with a multicast distribution advertisement, receiver 512 is determined to be a target of a particular bulk data distribution and receiver 514 is determined not to be a target. As described above, receiver 512 (denoted "active multicast receiver") joins the multicast distribution via a multicast group message 516. Conversely, receiver 514 (denoted "inactive multicast receiver") does not join the multicast group. Consequently, in the multicast of the bulk data, router 506 flows the multicast bulk distribution data onto subnet 502, to be received by multicast receiver 512. However, router 508 ignores the multicast distribution, and consequently, no data flows onto subnet 504 as a result of the multicast bulk distribution. In this way, the forwarding of multicast bulk distribution data onto subnets that have no receivers that are intended targets of the distribution may be mitigated.

Figure 6:
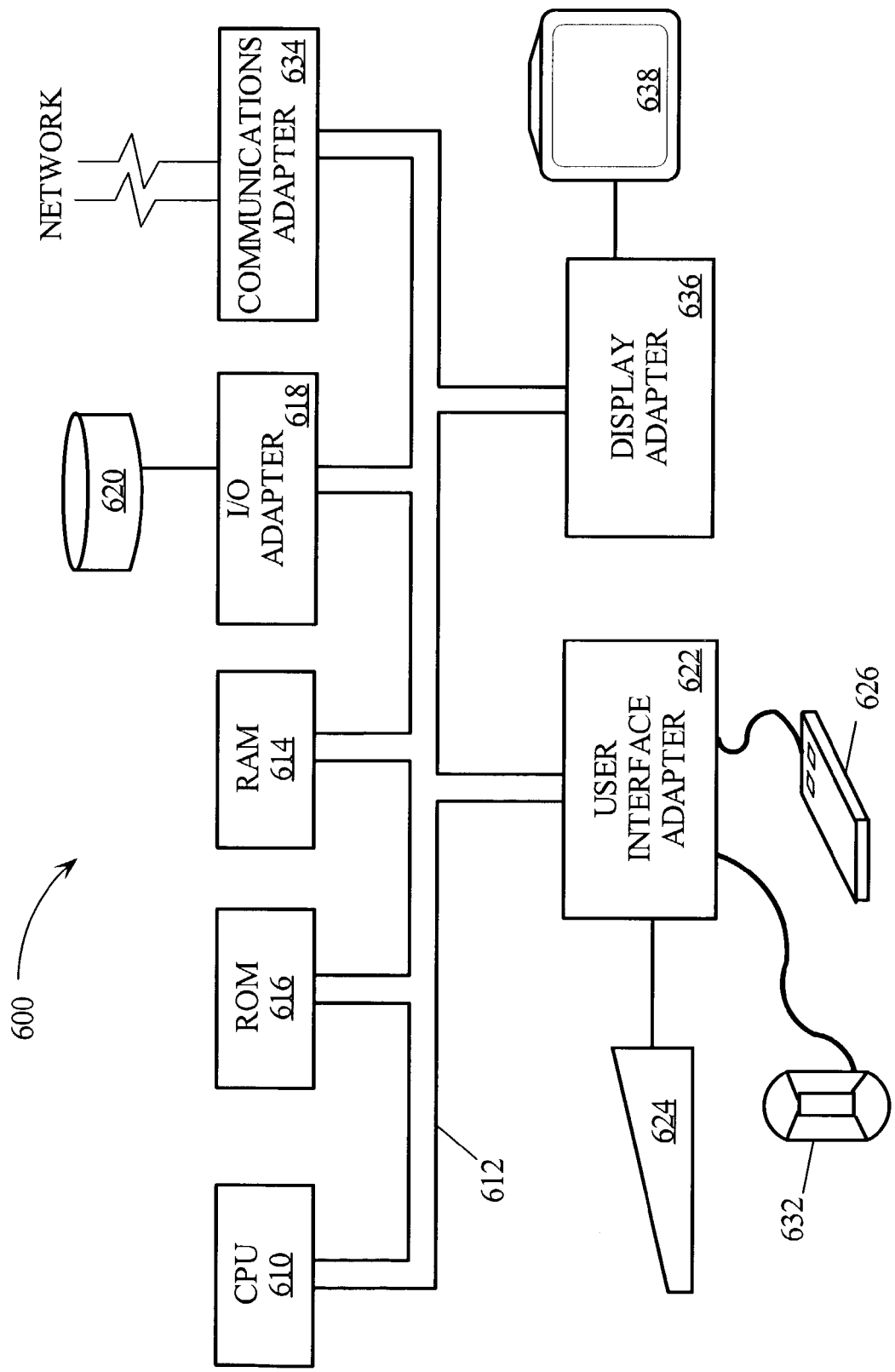
FIG. 6 illustrates, in block diagram form, a data processing system, which may be used in conjunction with the embodiments of the present invention in FIGS. 2 and 4.

Referring now to FIG. 6, there is illustrated an exemplary hardware configuration of data processing system 600 in accordance with the subject invention. In one embodiment, this system in conjunction with methodology 200, may be used for multicast bulk data distribution. In another embodiment, this system in conjunction with methodology 400, may be used for receiving a multicast bulk data distribution.

Data processing system 600 includes central processing unit (CPU) 610, such as a conventional microprocessor, and a number of other units interconnected via system bus 612. Data processing system 600 also includes random access memory (RAM) 614, read only memory (ROM) 616 and input/output (I/O) adapter 618 for connecting peripheral devices such as disk units 620 to bus 612, user interface adapter 622 for connecting keyboard 624, mouse 626, trackball 632 and/or other user interface devices such as a touch screen device (not shown) to bus 612. System 600 also includes communication adapter 634 for connecting data processing system 600 to a data processing network, enabling the system to communicate with other systems, and display adapter 636 for connecting bus 612 to display device 638. CPU 610 may include other circuitry not shown herein, which will include circuitry commonly found within a microprocessor, e.g. execution units, bus interface units, arithmetic logic units, etc. CPU 610 may also reside on a single integrated circuit.

Preferred implementations of the invention include implementations as a computer system programmed to execute the method or methods described herein, and as a computer program product. According to the computer system implementation, sets of instructions for executing the method or methods are resident in the random access memory 614 of one or more computer systems configured generally as described above. In one embodiment, these sets of instructions, in conjunction with system components that execute them may multicast bulk data distributions, as described in conjunction with FIG. 2. In another embodiment, these sets of instructions, in conjunction with system components that execute them may receive multicast bulk data distributions, as described in conjunction with FIG. 4. Until required by the computer system, the set of instructions may be stored as a computer program product in another computer memory, for example, in disk drive 620 (which may include a removable memory such as an optical disk or floppy disk for eventual use in the disk drive 620). Further, the computer program product can also be stored at another computer and transmitted to the users work station by a network or by an external network such as the Internet. One skilled in the art would appreciate that the physical storage of the sets of instructions physically changes the medium upon which is the stored so that the medium carries computer readable information. The change may be electrical, magnetic, chemical, biological, or some other physical change. While it is convenient to describe the invention in terms of instructions, symbols, characters, or the like, the reader should remember that all of these in similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Although the present invention and its advantages have been described in detail, it should be understood that various changes, substitutions and alterations can be made herein without departing from the spirit and scope of the invention as defined by the appended claims.

What is claimed is:

1. A method for multicast distribution of bulk data comprising:
   receiving, by a router, a multicast message on a selected multicast address, the multicast message including a list of target receivers of a data distribution and a multicast address of the distribution;
   forwarding the multicast message by the router to a subnet associated with the router;
   joining, by the router, a given receiver to a multicast group associated with the multicast address if the given receiver is included in the list of target receivers, wherein the given receiver in the set of potential target receivers is selectively joined to the multicast group having the multicast address of the distribution in response to the list of target receivers;
   receiving, by the router, the data distribution on the multicast address included in the message;
   in response to receiving the data distribution by the router, determining by the router whether any receiver, which is connected to the subnet, is a member of the multicast group;
   forwarding the data distribution by the router to the subnet only if at least one receiver, which is connected to the subnet, is a member of the multicast group, wherein a receiver is not joined to the multicast group having the multicast address in the message if the receiver is not included in the list of target receivers; and
   wherein a receiver is joined to the multicast group having the multicast address in the message if the receiver is included in the list of target receivers.

2. The method of claim 1, wherein the selected multicast address included in the message is selected randomly by:
   (i) randomly selecting a first multicast address from a predetermined set of multicast addresses;
   (ii) listening on the first multicast address;
   (iii) if there is traffic on the first multicast address, listening on a second multicast address comprising a next address in the predetermined set of multicast addresses;
   (iv) if there is no network traffic on the first multicast address, selecting the first multicast address; and
   (v) if there is network traffic on the second network address, repeating the steps of listening on a next multicast address and selecting a multicast address if there is no traffic on the multicast address.

3. The method of claim 2, wherein the step of listening on the first multicast address has a duration in a time interval of between one (1) second and fifteen (15) seconds.

4. A computer program product stored on a non-transitory computer readable medium, the computer program product including programming instructions for multicast distribution of bulk data comprising instructions for:
   receiving, by a router, a multicast message on a selected multicast address, the multicast message including a list of target receivers of a data distribution and a multicast address of the distribution;
   forwarding the multicast message by the router to a subnet associated with the router;
   joining, by the router, a given receiver to a multicast group associated with the multicast address if the given receiver is included in the list of target receivers, wherein the given receiver in the set of potential target receivers is selectively joined to the multicast group having the multicast address of the distribution in response to the list of target receivers;
   receiving, by the router, the data distribution on the multicast address included in the message;
   in response to receiving the data distribution by the router, determining by the router whether any receiver, which is connected to the subnet, is a member of the multicast group;
   forwarding the data distribution by the router to the subnet only if at least one receiver, which is connected to the subnet, is a member of the multicast group, wherein a receiver is not joined to the multicast group having the multicast address in the message if the receiver is not included in the list of target receivers; and
   wherein a receiver is joined to the multicast group having the multicast address in the message if the receiver is included in the list of target receivers.

5. The computer program product of claim 4, wherein the selected multicast address included in the message is selected randomly by:
   (i) randomly selecting a first multicast address from a predetermined set of multicast addresses;
   (ii) listening on the first multicast address;
   (iii) if there is traffic on the first multicast address, listening on a second multicast address comprising a next address in the predetermined set of multicast addresses;
   (iv) if there is no network traffic on the first multicast address, selecting the first multicast address; and
   (v) if there is network traffic on the second network address, repeating the steps of listening on a next multicast address and selecting a multicast address if there is no traffic on the multicast address.

6. The computer program product of claim 5 wherein the step of listening on the first multicast address has a duration in a time interval of between one (1) second and fifteen (15) seconds.

7. A data processing system including:
   a source of a bulk data distribution for connecting to a network and including:
   circuitry for receiving a multicast message on a selected multicast address, the multicast message including a list of target receivers of a data distribution and a multicast address of the distribution;
   circuitry for forwarding the message by the router to a subnet associated with the router;
   circuitry for joining a given receiver to a multicast group associated with the multicast address if the given receiver is included in the list of target receivers, wherein the given receiver in the set of potential target receivers is selectively joined to the multicast group having the multicast address of the distribution in response to the list of target receivers;
   circuitry for receiving the data distribution on the multicast address included in the message;
   circuitry for determining by the router, in response to receiving the data distribution by the router, whether any receiver, which is connected to the subnet, is a member of the multicast group;
   circuitry for forwarding the data distribution by the router to the subnet only if at least one receiver, which is connected to the subnet, is a member of the multicast group, wherein a receiver is not joined to the multicast group having the multicast address in the message if the receiver is not included in the list of target receivers; and wherein a receiver is joined to the multicast group having the multicast address in the message if the receiver is included in the list of target receivers.

8. The system of claim 7, wherein the source includes circuitry for randomly selecting the selected multicast address included in the message, including:

circuitry for randomly selecting a first multicast address from a predetermined set of multicast addresses;

circuitry for listening on the first multicast address;

circuitry for, if there is traffic on the first multicast address, listening on a second multicast address comprising a next address in the predetermined set of multicast addresses;

circuitry for, if there is no network traffic on the first multicast address, selecting the first multicast address; and circuitry for, if there is network traffic on the second network address, repeating the steps of listening on a next multicast address and selecting a multicast address if there is no traffic on the multicast address.

9. The system of claim 8 wherein the circuitry for listening on the first multicast address includes circuitry for listening for a duration in a time interval of between one (1) second and fifteen (15) seconds.

10. A data processing network including:

a source of a bulk data distribution for connecting to a network and wherein the source is used for multicasting a message on a selected multicast address, the message including a list of target receivers of a data distribution and a multicast address of the distribution, and wherein the source is used for multicasting the data distribution on the multicast address included in the message;

a first plurality of receivers connected to a first router associated with a first subnetwork, the first subnetwork for connecting to the network using the first router, wherein the first plurality of receivers listens on the selected multicast address, and wherein a receiver in the first plurality of receivers does not join a multicast group having the multicast address received in the message if the receiver is not included in the list of target receivers, and another receiver in the first plurality of receivers joins a multicast group having the multicast address received in the message if the receiver is included in the list of target receivers, wherein the first router sends received multicast bulk data to the first subnetwork only if at least one of the first plurality of receivers has joined the multicast group; and a second plurality of receivers connected to a second router associated with a second subnetwork which is a different subnetwork than the first subnetwork, the second subnetwork is used for connecting to the network using the second router, wherein the second plurality of receivers listens on the selected multicast address, and wherein a receiver in the second plurality of receivers does not join a multicast group having the multicast address received in the message if the receiver is not included in the list of target receivers, and another receiver in the second plurality of receivers joins a multicast group having the multicast address received in the message if the receiver is included in the list of target receivers, wherein the second router sends received multicast bulk data to the second subnetwork only if at least one of the second plurality of receivers has joined the multicast group.

* * * * *